Aug. 12, 1952 M. FLEISCHER 2,606,611
GRAVITY MOTOR CLOCK
Filed March 9, 1950
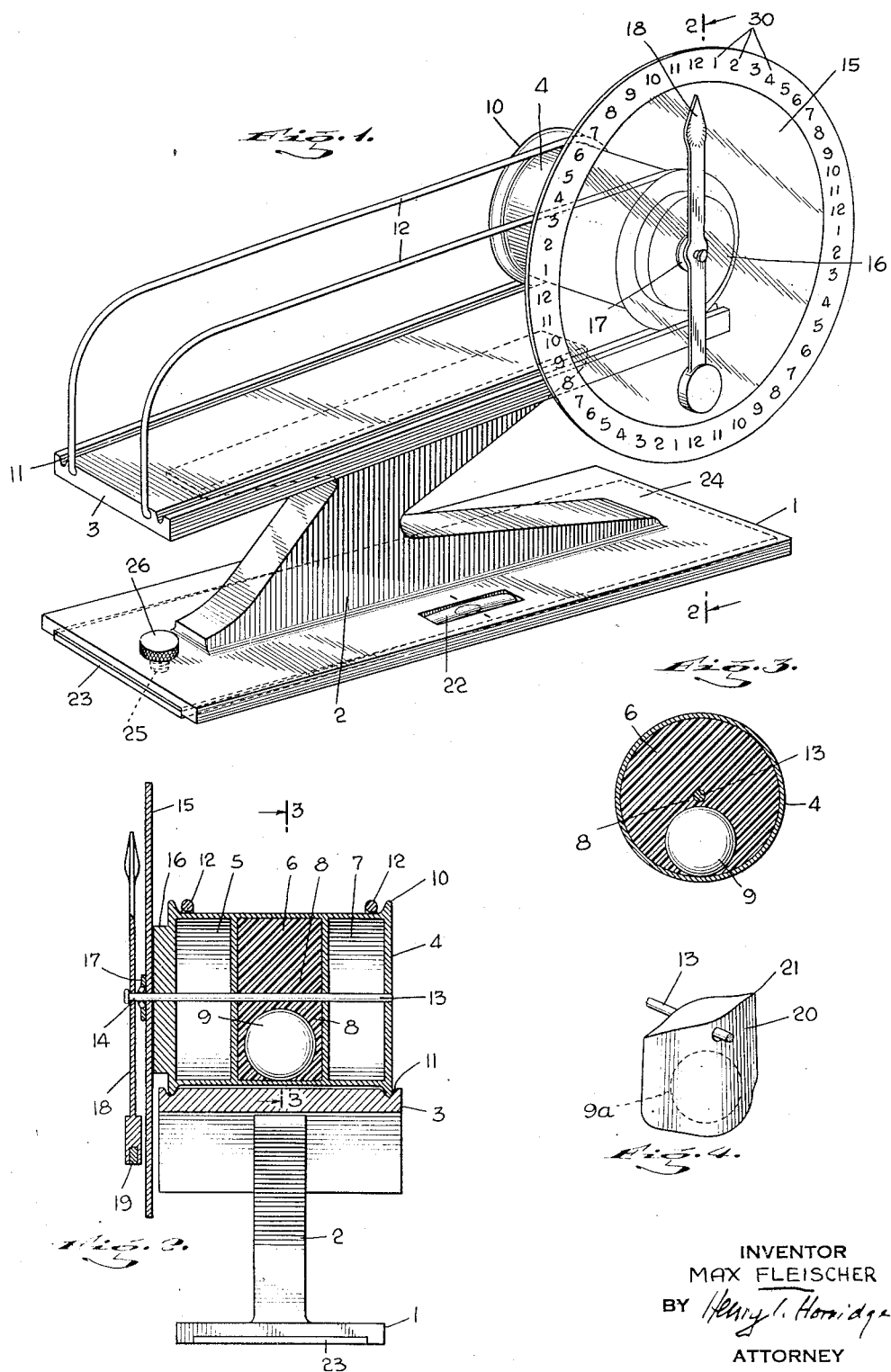
INVENTOR
MAX FLEISCHER
BY Henry I. Horridge
ATTORNEY Patented Aug. 12, 1952

2,606,611

UNITED STATES PATENT OFFICE 2,606,611

GRAVITY MOTOR CLOCK

Max Fleischer, New York, N. Y.

Application March 9, 1950, Serial No. 148,724

17 Claims. (Cl. 161—15)

My invention relates to a self-impelled motor in which the power is furnished by a controlled displacement of the center of gravity of a weight within a viscous substance.

The motor of my invention is a self-impelled motor of the utmost simplicity, capable of constant and precise movement, comprising a weight within a heavy viscous substance having a constant, small rate of flow, the specific gravity of the weight being substantially greater than the specific gravity of the viscous substance, both weight and viscous substance being contained within a casing, and a runway inclined to the horizontal upon which the casing is placed for downward movement thereon, the inclination of said runway inducing a constant displacement of the center of gravity of the weight under the slowly yielding restraint of said viscous substance.

An object of my invention is to translate the movement of such a motor to operate a time interval indicating device, horological instrument or clock. Other applications of said motor to practical uses are feasible.

A viscous substance which I have found to be suitable for use in my invention is the General Electric Company's so-called silicone bouncing putty, which may be defined as the filled putty-like product of reaction under heat of a mixture of ingredients comprising an organo polysiloxane, for example, a dimethyl polysiloxane, with a boron compound such as, for instance, boric acid, pyroboric acid, boric oxide, etc. Two standard grades of that product are available, designated by the General Electric Company as 9991—1 and 9991—2.

Referring particularly to G-E bouncing putty 9991—1, it is a pink colored putty having a low specific gravity, medium hardness, with about 50% rebound, which will flow under its own weight. Its rate of flow is very small at the pressures and temperatures to be normally encountered in the application of my invention, for instance, pressures up to 100 p. s. i. and temperatures up to 40° C. At a pressure, for instance, up to approximately two atmospheres, there is no noticeable decrease in the rate of flow in the decrease of temperature from room temperature to the freezing point of water. Its fluidity increases in direct proportion to increasing shearing stress at a constant temperature. Its viscosity decreases in direct proportion to increasing temperatures. It is generally like ordinary putty and is plastic, moldable and resilient, undergoing very little aging over a prolonged period of time insufficient markedly to affect its properties or utilities for the present purposes. It may be prepared with different characteristics of flow, hardness, specific gravity, etc.

Other materials and products than the General Electric bouncing putty may be usefully employed in carrying out my invention. The prime characteristics that should be observed are a heavy viscosity of putty-like consistency having a small rate of flow, constant through a rather extensive range of temperatures and pressures and unimpairment of its essential characteristics with age.

Such another product is for example a silicone oil produced by the General Electric Company and designated by it as G. E. 9946—400,000, which may be defined as a highly polymerized polydimethyl siloxane.

I have shown in the drawings and hereinafter described one embodiment of my said motor and its application to provide a time interval indicating device, horological instrument or clock. Other uses are feasible.

Referring to the drawings:

Fig. 1 is a perspective view of a time interval indicating device, horological instrument or clock embodying my invention.

Fig. 2 is a cross-section along the line of 2—2 of Fig. 1.

Fig. 3 is a cross-section of the casing along the line of 3—3 of Fig. 2.

Fig. 4 is a perspective view of another type of weight that may be employed.

The motor shown in the drawings comprises a stand 1 carrying a vertical support 2 upon which an inclined runway 3 is mounted, a cylindrical casing 4 divided into three cylindrical compartments 5, 6, 7. The inner compartment 6 is filled with G-E silicone bouncing putty 9991—1, designated as 8 and within compartment 6 is placed a steel ball bearing 9. Compartment 6 is air sealed and preferably compartments 5 and 7 also.

Compartments 5 and 7 are empty. Their purpose is to increase the stability of casing 4 upon runway 3 to prevent accidental upsetting by increasing the length of casing 4.

Casing 4 is provided with flanges 10 which engage the grooves 11 of runway 3, the shape of flanges 10 and grooves 11 being designed to reduce friction as much as possible. Rails 12 are mounted on runway 3 and extend over casing 4, inside of flanges 10, with a clearance over casing 4. These rails 12 serve to prevent the accidental upsetting of casing 4 when in position on runway 3. Rails 12 are mounted so that they may be lifted or disengaged from either or both ends of runway 3 to enable casing 4 to be initially placed on runway 3 underneath rails 12.

A shaft 13 extends through the longitudinal axis of casing 4, rigidly secured to it and protruding therefrom at one end thereof at 14 as seen in Fig. 2.

A dial 15 is mounted on shaft 13 so that it will turn with casing 4 but nevertheless may be hand adjusted relative to casing 4 for the purpose of time-setting. This is accomplished, in a simple form, by spacing plate 16 and washer or wing nut 17 which is swaged on shaft 13 to provide the proper pressure of dial 15 and spacing plate 16 against the end of casing 4.

Loosely mounted at the protruding end of shaft 13 is an indicator 18 having a weighted lower end 19 so that indicator 18 will always remain in a position normal to the horizontal.

The marginal area of dial 15 is marked with time interval indications 30, shown as the numerals 1–12 in Fig. 1, in four sequences of 1 to 12 hours, giving a total time period of forty-eight hours for one complete revolution of dial 15. By varying the diameter of casing 4 one revolution or a predetermined fraction thereof can be completed in other time intervals.

As shown in Figs. 2 and 3, the weight 9, comprising a steel ball bearing, is freely placed in compartment 6 of casing 4. A modification is shown in Fig. 4 where the weight 20 comprising a moldable substance weighted by a solid steel ball bearing 9a imbedded within it, is loosely suspended on shaft 13. Weight 20 has converging ends 21 to facilitate its movement through the viscous substance 8.

Stand 1 has mounted therein a spirit level 22, to establish whether when set upon a table or other support stand 1 lies in a horizontal plane. The bottom of stand 1 is grooved throughout its length to receive a panel 23 therein which is secured at one end at its corners 24. At the opposite end, a screw 25 having a knurled knob 26, extends through stand 1 and engages panel 23. If stand 1 is not in a horizontal plane, by turning down screw 25, that end of stand 1 may be elevated until stand 1 is horizontal. This adjustment may also be used to lower the angle of inclination of stand 1 if the rate of movement of casing 4 down runway 3 is too fast. Several other types of such adjustment of stand 1 will occur to those skilled in the art.

For a small time interval indicating device, horological instrument or clock capable of completing one revolution of dial 15 in 48 hours, the following specifications are suitable: length of runway 3, 5¼ inches; inclination of runway 3 to stand 1, 18°; bouncing putty compartment 6 of casing 4, ¾ inch wide by 1½ inches diameter, both inside measurements; diameter of spherical weight 9, ⅝ inch, weight, 16 grams, specific gravity about 8; weight of bouncing putty in compartment 6, 18 grams, specific gravity about 4; diameter of shaft 13, $\frac{1}{16}$ inch, leaving a clearance between it and weight 9 of $\frac{3}{32}$ inch.

The operation of the time interval indicating device, horological instrument or clock and motor is as follows: Casing 4 is placed at the head of inclined runway 3. No care need be taken in so positioning it because if placed thereon with weight 9 materially off its center of gravity, casing 4 will oscillate until it becomes at rest with weight 9 on or almost on its center of gravity. Dial 15 is then adjusted so that indicator 18 points at the actual time.

Vector forces act upon weight 9 having a vertical downward component and a component along runway 3 so that weight 9 always seeks a lower level. It cannot move downwardly but can only move in the direction of runway 3, namely, downhill, but such movement is restrained by the putty 8, casing 4 etc. Weight 9 is therefore the real motivating force of the motor and that force is represented by the potential energy in the weight 9 due to its position which potential energy is dissipated in a slow, controlled manner as weight 9 moves down runway 3. Weight 9 also exerts a continuous pressure against putty 8 slowly moving through the same.

The movement of casing 4 down runway 3 induced by the movement of weight 9 in the case of the specimen described is hardly perceptible to the eye, but is easily ascertained, as the hours go by, by consecutive time interval indications 30 on dial 15 appearing above indicator 18.

The turning of shaft 13 with casing 4 can be used to operate other or associated devices. While the principal motivating force of the motor is weight 9 as explained, the movement of weight 9 is controlled by the restlessness of the unusual putty-like materials described. The material is constantly prevented from obtaining a state of rest during the progress of weight 9. This is undoubtedly so where compartment 6 is partially filled with the said viscous substance but probably exists likewise even when compartment 6 is completely filled.

A motor constructed according to the specifications hereinbefore stated, will produce the travel of casing 4 along runway 3 through an arc of 7½° in one hour.

When casing 4 reaches the lower end of runway 3, it is simply moved up to the upper end, which can be done without changing its time setting, whereupon it resumes its down hill course on runway 3 for another forty-eight hours, and this cycle of operation may be repeated without end.

If runway 3 were of greater length, a greater overall period of time could be covered by the movement of casing 4 upon it, with appropriate changes of the time interval indications 30.

The rate of movement of casing 4 upon runway 3 will be governed by the rate of flow of the viscous substance used, the pressure upon the substance by the weight employed as well as atmospheric pressure, and the degree of inclination of runway 3. Of these factors, the inclination of runway 3 furnishes the readiest means of regulating the rate of movement. By the adjustable means (panel 23, screw 25, Fig. 1) for changing the degree of inclination or other adjustable means, a change in this inclination furnishes a quick means for regulation, either of a corrective order or to produce further changes in the rate desired. In the latter case, the dial time interval indications 30 would require corresponding alteration.

Modifications of the motor and time clock as shown in the drawings may be made. For instance, it is not necessary to fill compartment 6 of casing 4 with the viscous substance 8; it will suffice if it is partially filled, in which case the viscous substance 8 will be in constant slow motion due to its characteristic of always seeking its level, which will have a slight additive effect on weight 9 changing its position. Further, dial 15 may be made stationary by loosely mounting it on shaft 13, and weighting its lower portion, in which case indicator 18 will be mounted on shaft 13 so as to turn with it and yet be capable of hand adjustment for the purpose of time-setting. In such case, the direction of inclination of runway 3 must be reversed, so that it inclines downwardly from left to right, so that indicator 18 will move in a clockwise direction.

The time interval indicating device, horological instrument or clock shown and described provides its own power. It requires no winding or outside source of power. It contains no gears, wheels, pendulum or other commonly known working parts. Its members are few in number and should last indefinitely. It should be free of the need for repairs or replacements due to wear. After its horizontal position has been adjusted with the aid of spirit level 22, screw 25 and panel 23, if it is periodically reset to the head of runway 3, it will operate indefinitely.

Great economy in production is assured by the simplicity and the small number of parts required.

I claim:

1. A motor comprising a housing containing a heavy viscous substance having an inherent constant rate of flow throughout a substantially extensive range of temperatures and pressures, a rotatable weight within said viscous substance and having a specific gravity substantially in excess of that of said viscous substance, a support for said housing inclined to the horizontal plane, the support engaging portions of said housing being circular in cross-section, said weight being contained within said viscous substance in such manner as to permit its rotation therein in the direction of the inclination of said support said housing being thereby adapted when placed on said support to move downwardly thereon at a constant rate regulated by the constant shifting of said weight by force of gravity against the constant yielding restraint of said viscous substance, the rate of flow of said viscous substance, the relative specific gravities of said viscous substance and weight and the angle of inclination of said support being so proportioned as to produce the desired rate of movement of said housing on said support.

2. A motor according to claim 1 wherein the viscous substance has a controlled constant rate of flow at a given pressure and temperature.

3. A motor according to claim 1 wherein the viscous substance is a filled putty-like product of reaction under heat of an organo polysiloxane and a substance selected from the group consisting of boric acid, pyroboric acid and boric oxide.

4. A motor according to claim 1 wherein the viscous substance is a filled putty-like product of reaction under heat of a dimethyl polysiloxane and a boron compound.

5. A motor according to claim 1 wherein the viscous substance is a highly polymerized polydimethyl siloxane.

6. A motor according to claim 1 wherein the viscous substance has the characteristic of flowing under its own weight.

7. A motor according to claim 1 wherein means are provided for connecting the movement of said housing down said runway to a desired application.

8. A motor comprising a housing containing a putty-like substance having the characteristic of flowing under its own weight at a constant rate, a rotatable weight within said voscous substance having a specific gravity substantially in excess of that of said viscous substance, a support for said housing inclined to the horizontal plane, the support engaging portions of said housing being circular in cross-section, said weight being contained within said putty-like substance in such manner as to permit its rotation therein in the direction of the inclination of said support, said housing being adapted to move downwardly on said support at a constant rate regulated by the constant flow of said viscous substance and the constant shifting of said weight by force of gravity, means to connect the motion of said housing to a desired application, the rate of flow of said putty-like substance, the relative specific gravities and weights of said putty-like substance and weight, and the angle of inclination of said support being so proportioned as to produce the desired rate of movement of said housing on said support.

9. A motor according to claim 8 wherein the putty-like substance has an inherent constant rate of flow at a given pressure and temperature.

10. A motor according to claim 8 wherein the said member is suspended in the said putty-like substance.

11. A time interval indicating device comprising a motor according to claim 1 wherein the said housing is capable of rotation down said inclined support, a shaft mounted on said housing, a dial bearing time interval indications mounted on said shaft, a time interval indicator mounted on said shaft, said dial and said indicator being so mounted thereon that one remains stationary in a perpendicular position throughout the rotation of said shaft and the other turns with said shaft, the stationary one of said dial and indicator being loosely mounted on said shaft and weighted at its lower portion with sufficient weight to keep it in a stationary perpendicular position.

12. A motor according to claim 1 wherein the said weight is suspended in said viscous subtance.

13. A time interval indicating device comprising a housing containing therein a putty-like substance having an inherent constant rate of flow at a given pressure and temperature, a rotatable weight within said putty-like substance having a specific gravity substantially in excess of that of said putty-like substance, an inclined support for said housing, the support engaging portions of said housing being circular in cross-secton, said weight being contained in said putty-like substance in such manner as to permit its rotation therein in the direction of the inclination of said support, said housing being thereby adapted when placed on said support to move downwardly thereon at a constant rate regulated by the constant shifting of said weight by force of gravity against the constant yielding restraint of said putty-like substance, the rate of flow of said putty-like substance, the relative specific gravities of said putty-like substance and weight and the angle of inclination of said support being so proportioned as to produce the desired rate of movement of said housing on said support, a shaft mounted on said housing, a dial, bearing time interval indications, and a time interval indicator mounted on said shaft in such manner that one remains stationary in a perpendicular position and the other turns with said shaft throughout its rotation, the stationary one being loosely mounted on said shaft and weighted to keep it in such stationary perpendicular position.

14. A time interval indicating device according to claim 13, wherein the said putty-like substance is a filled putty-like product of reaction under heat of an organo polysiloxane and a substance selected from the group consisting of boric acid, pyroboric acid and boric oxide.

15. A time interval indicating device according to claim 13 wherein the said putty-like substance is a filled putty-like product of reaction under heat of a dimethyl polysiloxane and a boron compound.

16. A time interval indicating device according to claim 13 wherein the said putty-like substance is a highly polymerized polydimethyl siloxane.

17. A time interval indicating device according to claim 13 wherein the said putty-like substance has the characteristic of flowing under its own weight.

MAX FLEISCHER.

REFERENCES CITED

The following references are of record in the file of this patent:

UNITED STATES PATENTS

| Number | Name | Date |
|---|---|---|
| 1,926,456 | Riggs | Sept. 12, 1933 |
| 2,234,437 | Kistler | Mar. 11, 1941 |

FOREIGN PATENTS

| Number | Country | Date |
|---|---|---|
| 1,555 | Great Britain | of 1860 |
| 56,881 | Switzerland | Aug. 4, 1911 |